UNITED STATES PATENT OFFICE.

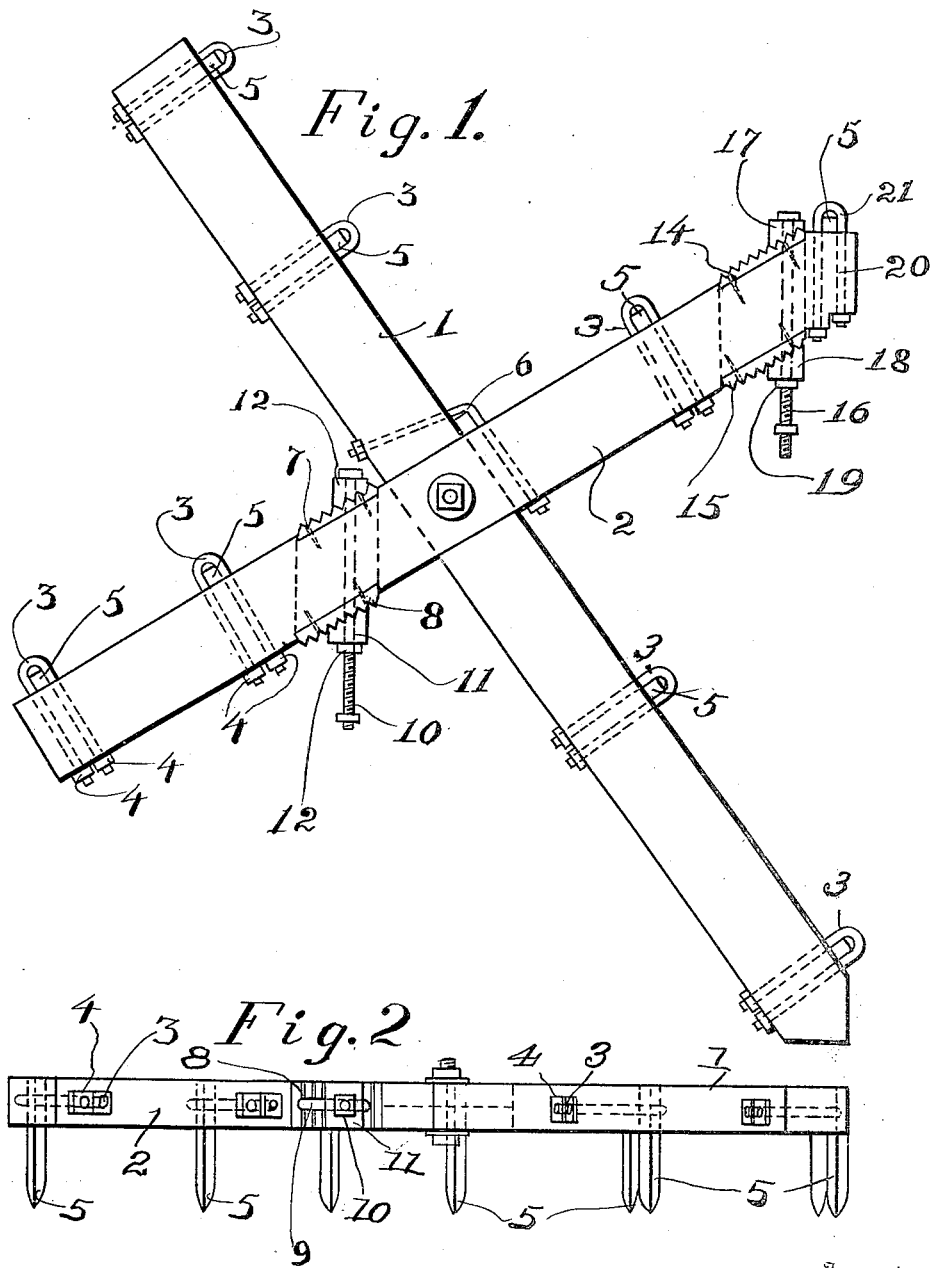

LESLIE E. FAWVER, OF SELIGMAN, MISSOURI.

HARROW ATTACHMENT FOR CULTIVATORS.

1,131,499. Specification of Letters Patent. Patented Mar. 9, 1915.

Application filed August 21, 1914. Serial No. 857,902.

*To all whom it may concern:*

Be it known that I, LESLIE E. FAWVER, a citizen of the United States, residing at Seligman, in the county of Barry and State of Missouri, have invented certain new and useful Improvements in Harrow Attachments for Cultivators; and I do hereby declare the following to be a full, clear, and exact description of the invention, such as will enable others skilled in the art to which it appertains to make and use the same.

This invention relates to cultivators and the primary object of the invention is the provision of a harrow attachment for the ordinary type of riding or walking cultivators, which attachment may be attached to any ordinary cultivator for the proper cultivation of tender or young plants such as corn or the like.

Another object of the invention is the provision of an attachment as specified and means for attaching the same to the ordinary cultivator beam which may be adjustable for attachment to cultivators of various sizes.

With the foregoing and other objects in view this invention consists in such novel features of construction, combination and arrangement of parts as will be hereinafter more fully described.

In describing the invention in detail reference will be had to the accompanying drawings wherein like characters designate like or corresponding parts throughout the several views, and in which:—

Figure 1 is a top plan view of the improved cultivator attachment, and Fig. 2 is a side elevation of the same.

Referring more particularly to the drawings, 1 and 2 designate harrow teeth supporting bars which are connected intermediate their ends in angled relation with each other, the bar 1 extending obliquely and substantially at right angles to the bar 2 as is clearly shown in Fig. 1 of the drawings. The bars 1 and 2 are mortised so that their intermediate connected portions will fit one in the other for permitting their surfaces to remain in alinement with each other.

The bars 1 and 2 have secured thereto at spaced intervals along their lengths U-shaped bolts 3, which bolts extend through the bars 1 and 2 and have the ends of their arms secured against movement by nuts 4. The U-shaped bolts 3 have harrow teeth 5 between their arms, their vertex and one side edge of the bars 1 and 2, so that as the nuts 4 are tightened upon the ends of the arms of the U-shaped bolt the harrow teeth 5 will be drawn and held in firm engagement with the edges of the bars. The connection of the bars is reinforced by an angled bolt 6 which extends through the bars as is clearly shown in Fig. 1 of the drawings. The bolt 6 is bent so as to securely hold a harrow tooth in the corner formed by the meeting of bars 1 and 2.

The bar 2 has secured to its side edges serrated plates 7 and 8, which plates are mounted upon opposite sides or edges of the bar 2 and are provided with slots 9 extending therethrough which slots extend through the bar 2 and have a bolt 10 slidably seated therein. The bolt 10 has lugs 11 and 12 mounted thereupon, which lugs are provided with serrated surfaces for engagement with the serrated plates 7 and 8, so that when the serrated lugs are drawn toward each other and into engagement with the serrated plates 7 and 8 by the nut 12' which is mounted upon the bolt, the bolt 10 will be held in various adjusted positions along the length of the slots 9 to properly adjust the bolt for attachment to the shovel supporting beam of an ordinary riding or walking cultivator.

The bar 2 has plates 14 and 15 which are provided with serrations on their outer faces secured to the end thereof and these bars are provided with slots extending therethrough which communicate with the slot extending transversely through the bar 2. The slot which extends transversely through the bar 2 has a bolt 16 slidably seated therein upon which bolt lugs 17 and 18 are mounted. The lugs 17 and 18 are provided with serrated surfaces for engagement with the serrated surface of the plates 14 and 15. The lugs 17 and 18 are held upon the bolt 16 for engagement with plates 14 and 15 respectively and they are moved and held into binding engagement with the serrated surfaces of the plate by a nut 19 which is adjustably mounted upon the bolt. The bolt 16 is provided for attachment to one of the shovel supporting beams of an ordinary cultivator. The bar 2 has an extension 20 formed upon its end to which the plates 14 and 15 are attached, which projection extends from the end of the bar at an angle thereto and has a U-shaped bolt 21 inserted through the beam as is clearly shown in Fig. 1 of the drawings.

The U-shaped bolt 21 holds an ordinary harrow tooth by the engaging end of the projection.

In the operation of the improved attachment as heretofore specified, the bolts 10 and 16 are attached to several supporting beams of an ordinary riding or walking cultivator, and the bars 1 and 2 which have the harrow teeth 5 secured thereto are positioned beneath the supporting frame of the cultivator (not shown) and replace the ordinary shovels for surface cultivation of plants. In the employment of the attachment, both right and left hand attachment will be made for attachment to both sides of the cultivator.

In reducing the invention to practice certain minor features of construction, combination and arrangement of parts may necessitate alterations to which the patentee is entitled provided such alterations are comprehended within the scope of what is claimed.

What is claimed is:—

1. In a harrow attachment for ordinary cultivators, a pair of bars connected intermediate their ends and extending substantially at right angles to each other, U-shaped bolts carried by said bars for detachably attaching ordinary harrow teeth to the bars, and means carried by one of said bars for attaching the same to the plow beams of a cultivator.

2. In a harrow attachment for ordinary cultivators, embodying shovel carrying beams, a pair of bars connected intermediate their ends and extending substantially at right angles to each other, U-shaped bolts detachably connected to said bars for attaching harrow teeth thereto, serrated plates attached to the opposite edges of said bars, bolts adjustably carried by said bars and lugs slidably mounted upon said bolts for engagement with said serrated plates for holding said bolts in various adjusted positions upon said bar.

In testimony whereof I affix my signature in presence of two witnesses.

LESLIE E. FAWVER.

Witnesses:
G. T. NORTHCULT,
S. R. OSBORNE.

Copies of this patent may be obtained for five cents each, by addressing the "Commissioner of Patents, Washington, D. C."